United States Patent
He et al.

(10) Patent No.: US 6,730,424 B1
(45) Date of Patent: May 4, 2004

(54) ELECTROCHEMICAL METHOD TO IMPROVE THE PERFORMANCE OF $H_2$/AIR PEM FUEL CELLS AND DIRECT METHANOL FUEL CELLS

(75) Inventors: Chunzhi He, Westfield, NJ (US); Zhigang Qi, North Arlington, NJ (US); Arthur Kaufman, West Orange, NJ (US)

(73) Assignee: H Power Corporation, Belleville, NJ (US)

( * ) Notice: Subject to any disclaimer, the term of this patent is extended or adjusted under 35 U.S.C. 154(b) by 209 days.

(21) Appl. No.: 10/097,216

(22) Filed: Mar. 14, 2002

(51) Int. Cl.[7] .............................. H01M 8/04; H01M 8/10
(52) U.S. Cl. ........................................................ 429/13
(58) Field of Search ...................................... 429/12, 13

(56) References Cited

U.S. PATENT DOCUMENTS

| | | | |
|---|---|---|---|
| 4,756,718 A | * | 7/1988 | Ueno et al. ............ 29/623.5 |
| 5,480,851 A | | 1/1996 | Tsurumi et al. |
| 5,501,915 A | | 3/1996 | Hards et al. |
| 5,601,936 A | * | 2/1997 | Dudfield et al. ............ 429/13 |
| 5,672,438 A | * | 9/1997 | Banerjee et al. ............ 429/33 |

* cited by examiner

*Primary Examiner*—Susy Tsang-Foster
(74) *Attorney, Agent, or Firm*—Mark Levy & Associates

(57) ABSTRACT

A method is described for improving the performance of fuel cells such as $H_2$/air PEM fuel cells and direct methanol fuel cells. It has been discovered that $H_2$ evolution can significantly improve the performance of air cathodes and direct methanol fuel cell anodes. The improvement of air cathodes applies to both $H_2$/air PEM fuel cells and direct methanol fuel cells.

3 Claims, 3 Drawing Sheets

Performance Before and After $H_2$ Evolution

Performance Before and After H₂ Evolution

Anode Polarization before and after $H_2$ Evolution

Performance of A DMFC before and after H₂ Evolution

ELECTROCHEMICAL METHOD TO IMPROVE THE PERFORMANCE OF H₂/AIR PEM FUEL CELLS AND DIRECT METHANOL FUEL CELLS

FIELD OF THE INVENTION

This invention relates to a proton exchange membrane (PEM) fuel cell, a direct methanol fuel cell (DMFC) and, more particularly, to the performance improvement of $H_2$/air PEM fuel cells and direct methanol fuel cells.

BACKGROUND OF THE INVENTION

Proton exchange membrane (PEM) fuel cells and direct methanol fuel cells are devices that convert the chemical energy of fuels, such as hydrogen and methanol, directly into electrical energy. The major components of a fuel cell include an anode, an electrolyte, and a cathode. The electrodes are usually made from noble metals such as platinum and platinum/ruthenium alloys and the electrolyte usually comprise a proton exchange membrane, such as Nafion® ionic-conducting, perfluorinated ionomer.

In $H_2$/air fuel cells, $H_2$ is oxidized at the anodes, $O_2$ is reduced at the cathodes, and electricity is generated when electrons produced in the electrode reactions flow in the external circuit. The electrode reactions are:

Fuel Cell Anode: $H_2 \rightarrow 2H^+ + 2e^-$

Fuel Cell Cathode: $\frac{1}{2}O_2 + 2H^+ + 2e^- \rightarrow H_2O$

Overall Reaction: $H_2 + \frac{1}{2}O_2 \rightarrow H_2O$

In direct methanol fuel cells, the anode fuel is methanol and the corresponding electrode reactions are:

Fuel Cell Anode: $CH_3OH + H_2O \rightarrow CO_2 + 6H^+ + 6e^-$

Fuel Cell Cathode: $3/2 O_2 + 6H^+ + 6e^- \rightarrow 3H_2O$

Overall Reaction: $CH_3OH + 3/2 O_2 \rightarrow 2H_2O + CO_2$

The performance of a fuel cell is directly dependent upon the activities of the two electrodes, which can be improved by increasing catalyst surface area and loadings. However, increasing the catalyst surface area is not without its limitations. U.S. Pat. No. 5,480,851, issued to Tsurumi, et al on Jan. 2, 1996 for PROCESS OF PREPARING CATALYST SUPPORTING HIGHLY DISPERSED METAL PARTICLES, discloses a method for making high surface area supported platinum catalysts. The highest surface area achieved with this method was approximately 170 m²/g-platinum.

Improving electrode activities through increasing catalyst loadings also has its limitations. At low catalyst loadings, the activities of the electrodes increase with the increase of the catalyst loadings. The performance of a fuel cell levels off after the catalyst loadings reach a certain point. Further attempts to increase the catalyst loadings can have a negative effect upon the performance, causing it to decline by reason of increasing ohmic and mass transfer resistance.

In addition, electrode activities are affected by catalyst utilization. It is known that only a portion of catalyst sites is utilized because other sites are not accessible to the reactants. The inaccessibility to some catalyst sites can be due to dead pores or pores filled with water, whereby gas reactants such as $O_2$ are prevented from reaching these catalyst sites. Improving catalyst utilization requires state of art skills.

U.S. Pat. No. 5,501,915, issued to Hards et al on Mar. 26, 1996 for POROUS ELECTRODE FOR ELECTRODE ASSEMBLIES IN A FUEL CELL, discloses an electrode preparation method which can greatly improve catalyst utilization. The disclosed method uses two components (catalyst component and gas supply component), instead of the traditional one component, in catalyst preparation. The addition of the gas supply component decreases the loss associated with mass transfer and enhances the platinum utilization by more than 20%. However, this two-component method is very complicated and makes mass production difficult.

It has been discovered by the applicants that $H_2$ evolution can significantly improve the performance of air cathodes and direct methanol fuel cell anodes. The improvement of air cathodes applies to both $H_2$/air PEM fuel cells and direct methanol fuel cells. This electrochemical method is very easy to carry out. Furthermore, it does not require the complicated electrode preparation procedure as disclosed in U.S. Pat. No. 5,501,915.

SUMMARY OF THE INVENTION

The present invention pertains to a method and article operating according to the method that improves the performance of cathode electrodes used in $H_2$/air PEM fuel cells and direct methanol fuel cells and anode electrodes used in direct methanol fuel cells. Fuel cell cathodes and anodes are often catalyzed with noble metals such as platinum and platinum/ruthenium alloys. It has been discovered that $H_2$ evolution can significantly improve the performance of air cathodes in $H_2$/air PEM fuel cells and direct methanol fuel cells and anodes in direct methanol fuel cells.

It is an object of this invention to provide a method that significantly improves the performance of $H_2$/air PEM fuel cells and direct methanol fuel cells. This method is $H_2$ evolution.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENT

Figure 1:
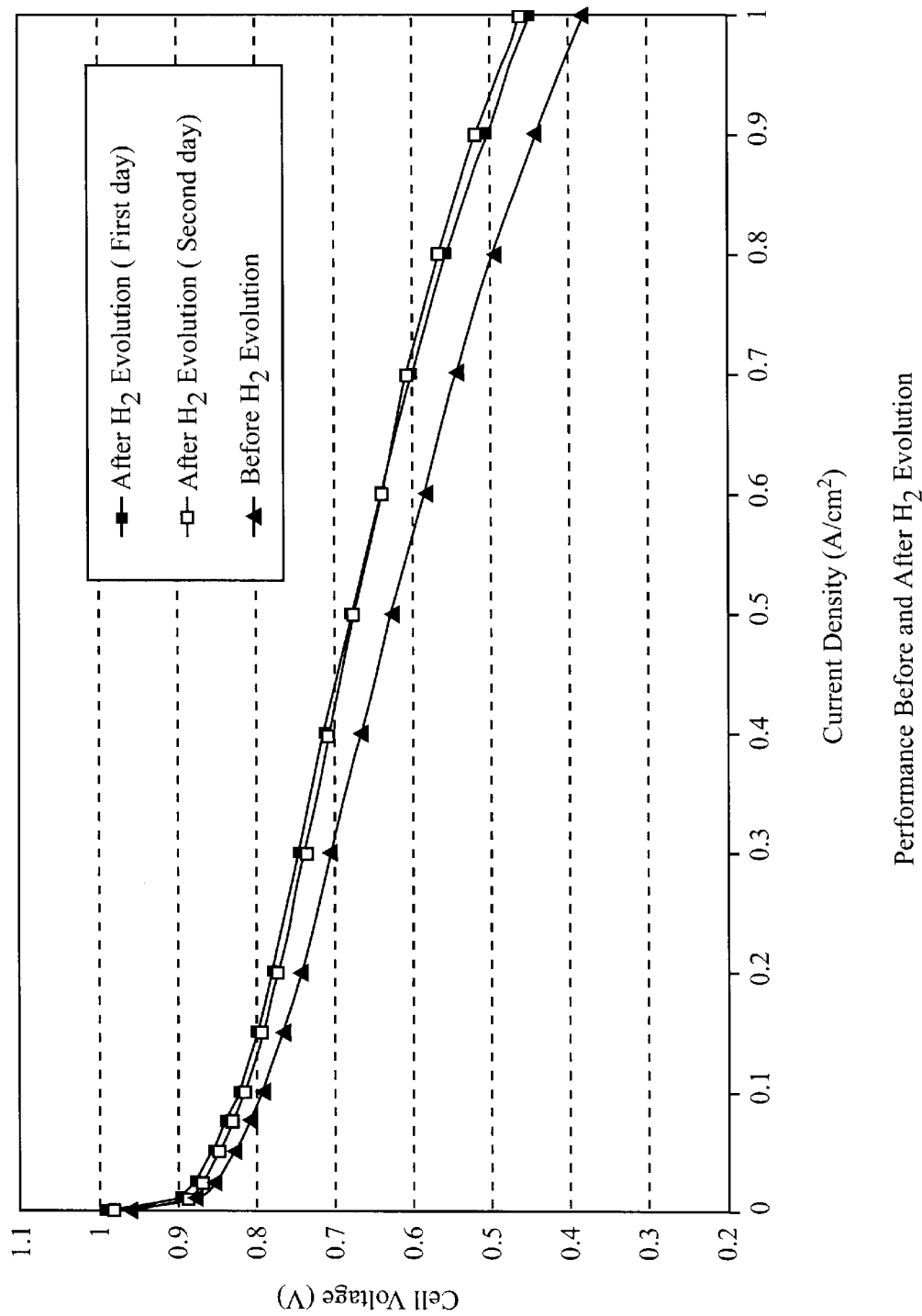
FIG. 1 illustrates a graph of the performance of an $H_2$/air fuel cell at 70° C., before and after $H_2$ evolution.

Generally speaking, the invention pertains to a method and an article operating in accordance with the method. The method is for improving the performance of fuel cells such as $H_2$/air PEM fuel cells and direct methanol fuel cells. It has been discovered that $H_2$ evolution can significantly improve the performance of air cathodes and direct methanol fuel cell anodes. The improvement of air cathodes applies to both $H_2$/air PEM fuel cells and direct methanol fuel cells. In the $H_2$/air PEM fuel cell, the air cathode can be activated using $H_2$ evolution through the following steps:

1) feed humidified hydrogen to the anode;
2) feed either humidified hydrogen or a humidified inert gas such as $N_2$ or Ar to the cathode;

2a) in using a humidified inert gas on the cathode, keep its flow rate low, or terminate its flow after all of the air is removed from the cathode;

3) apply a current to the fuel cell using a power supply with the cathode being negative and the anode positive. The electrode reactions are:

Fuel Cell Anode: $H_2 \rightarrow 2H^+ + 2e^-$

Fuel Cell Cathode: $2H^+ + 2e^- \rightarrow H_2$

Overall Reaction: $H_2$ (Anode) $\rightarrow H_2$ (Cathode)

The applied current can be 10 mA/cm$^2$ to 500 mA/cm$^2$. The applied current should preferably be between approximately 100 and 200 mA/cm$^2$. The activation time should be from approximately 10 minutes to 30 minutes. Owing to the fact that protons always take water when they transport from the anode to the cathode, currents larger than 500 mA/cm$^2$ should be avoided because it can cause the anode to dry out if the anode humidity is not high enough. Should this happen, a reverse $H_2$ evolution for the anode will re-humidify the anode. The previous $H_2$ evolution for the cathode will not be affected by the reverse anode $H_2$ evolution.

For a direct methanol fuel cell, the following procedural steps can be used to activate the cathode and the anode:

1) feed methanol to the cell anode and introduce an inert gas such as $N_2$ or Ar to the cell cathode to remove air from the cathode;

2) after all of the air is purged from the cathode, close the cathode inlet and keep open the cathode outlet;

3) using a power supply, apply a current to the cell. The connection to the power supply is dependent upon the electrode to be activated. If the cathode is to be activated, the cell cathode and anode are connected to the negative and positive terminals, respectively, of the power supply. A current between approximately 10 mA/cm$^2$ and 300 mA/cm$^2$ may be applied for about 10 to 30 minutes. The electrode reactions are:

Fuel Cell Anode: $CH_3OH + H_2O \rightarrow 6H^+ + CO_2 + 6e^-$

Fuel Cell Cathode: $2H^+ + 2e^- \rightarrow H_2$

Overall Reaction: $CH_3OH + H_2O \rightarrow 3H_2$ (Cathode) + $CO_2$ (Anode)

Activation of the anode is carried out by switching the terminal connection (i.e., the anode is connected to the power supply negative terminal and the cathode is connected to the power supply positive terminal). The applied current may be controlled by setting the voltage between the cell cathode and the cell anode in the approximate range of 0.5 V to 0.7 V. The electrode reactions for the activation of the anode are the exact opposite of $H_2$ evolution for the cathode:

Fuel Cell Anode: $2H^+ + 2e^- \rightarrow H_2$

Fuel Cell Cathode: $CH_3OH + H_2O \rightarrow 6H^+ + CO_2 + 6e^-$

Overall Reaction: $CH_3OH + H_2O \rightarrow 3H_2$ (Anode) + $CO_2$ (Cathode)

The methanol for the electrode reaction at the fuel cell cathode comes from methanol crossover through the membrane from the fuel cell anode side. The applied current should not be larger than the equivalent current of the methanol crossover rate or water decomposition will take place. This decomposition requires very high potential and can cause adverse effects on the fuel cell cathode platinum catalyst. Controlling the cell voltage in the range of 0.5 V to 0.7 V. will prevent this from happening.

After the activation through $H_2$ evolution, the performance of both $H_2$/air PEM fuel cells and direct methanol fuel cells improve immediately. It is believed that when hydrogen evolves from electrodes, it opens more micropores so that more active catalyst sites are available for oxygen reduction. Anode overpotential for methanol anode oxidation decreases after $H_2$ evolution. One of the reasons for the decrease in anode overpotential could also be the result of more available open pores, although it may also change the state of ruthenium. Though $CO_2$ generated from methanol oxidation may also open pores, it may not be effective because methanol oxidation requires high overpotential. Furthermore, for the same current, the amount of $CO_2$ generated is only one-third that of $H_2$.

The invention is illustrated by the following exemplary examples.

EXAMPLE 1

This example illustrates the effects of $H_2$ evolution on the performance of an $H_2$/air PEM fuel cell. The fuel cell electrodes were made by applying a layer of a catalyst ink on ELAT® gas diffusion media. The ink contained 70% of Pt on Vulcan-XC-72 catalyst (50% Pt) and 30% Nafion. The platinum loadings for both the anode and the cathode were 0.55 mg-Pt/cm$^2$. An MEA was then fabricated by pressing the electrodes onto a Nafion 1135 membrane at a temperature of 130° C. for 3 min. The MEA was inserted into a fuel cell fixture and tested at 70° C. The airflow rate was kept at 2.5 times the stoichiometric amount, and the hydrogen flow rate was kept at 3.0 times the stoichiometric amount. Before $H_2$ evolution, the cell was run for almost 3 hours and its performance data (current-voltage relationship) was measured. Then, the air in the cathode side was purged with $N_2$. After purging, the cathode inlet was turned off and its outlet was kept open. A current density of 200 mA/cm$^2$ was then applied to the cell for 20 minutes. After purging all $H_2$ from the cathode with $N_2$, the cell performance was re-evaluated with $H_2$/air. A significant improvement in cell performance was observed. For hours after $H_2$ evolution, no performance decay was observed. The cell was shut down and tested again the next day. It still maintained its high performance.

Now referring to FIG. 1, a graph shows the difference in fuel cell performance before and after $H_2$ evolution, and the stability of fuel cell performance after $H_2$ evolution.

EXAMPLE 2

Figure 2A:
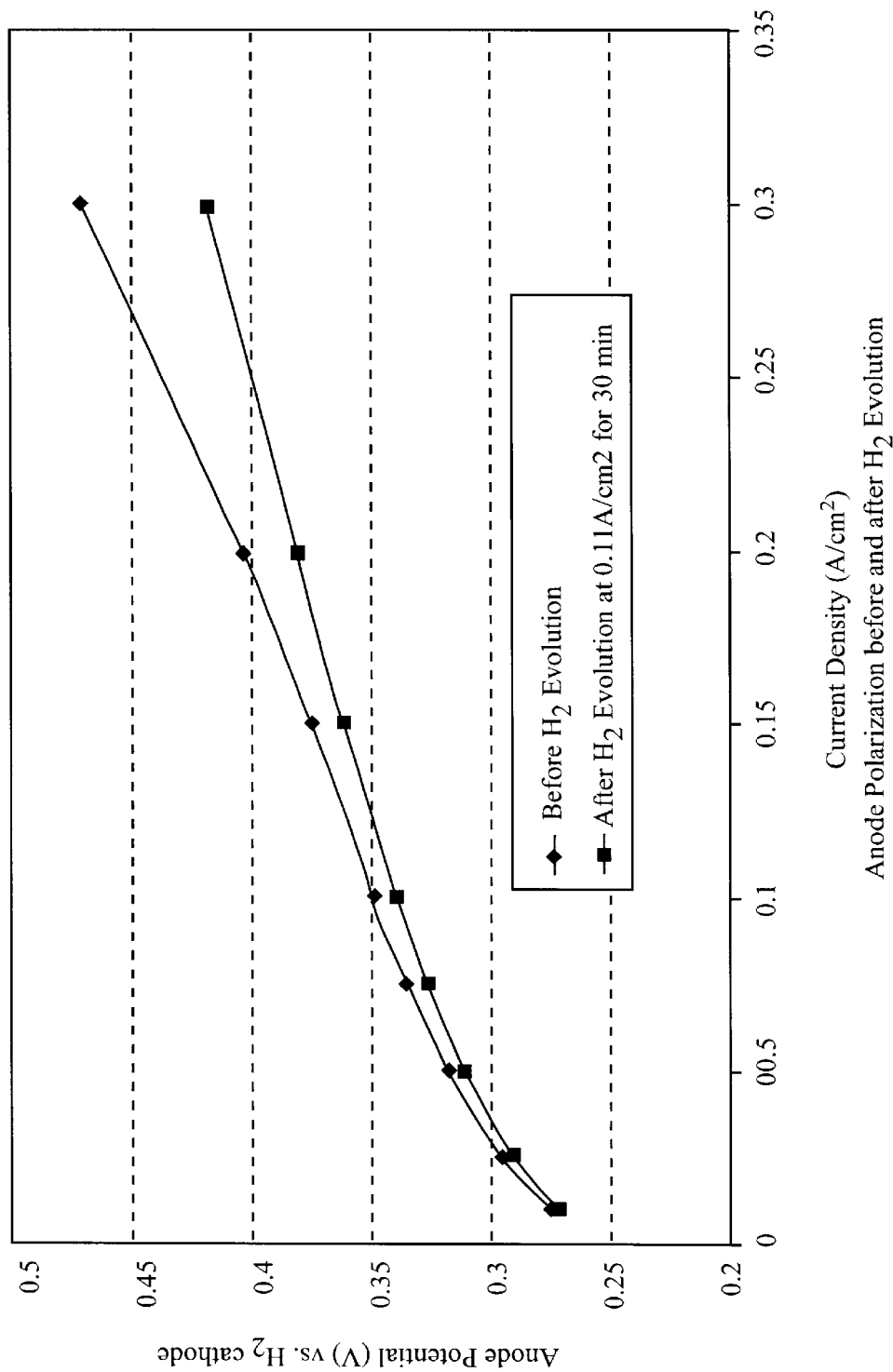
FIG. 2a shows a graph of the anode polarization of a direct methanol fuel cell at 60° C., before and after $H_2$ evolution on the anode.

This example illustrates the effects of $H_2$ evolution on direct methanol fuel cell anodes and the performance of direct methanol fuel cells. An MEA was made by pressing a Pt black cathode and a Pt/Ru black anode onto a Nafion 1135 membrane at a temperature of 130° C. The loadings of the electrodes were 5.6 mg-Pt/cm$^2$ for the cathode and 4.6 mg-Pt-Ru/cm$^2$ for the anode. The MEA was tested in a fuel cell fixture with air fed to the cathode and 1.0M methanol fed to the anode. The cell was operated at 60° C. and ambient pressure. The airflow rate was controlled at 4.0 times the stoichiometric amount. Prior to activating the anode and the cathode, performance data was recorded. Then, the cathode was purged with $N_2$. After all of the air was replaced with $N_2$, the cathode inlet was closed, while its outlet was kept open. $H_2$ evolution was first carried out on the cathode at a current density of 200 mA/cm$^2$ for 30 minutes. After this, the anode polarization was measured by varying the applied current and measuring the corresponding potential difference between the anode and the cathode. Since $H_2$ evolution has very low overpotential, the potential difference can be considered the anode polarization without IR compensation. $H_2$ evolution was then carried out on the anode by switching the polarity of the connection terminals of the power supply. A current density of 110 mA/cm$^2$ was applied for 30 minutes. After the completion of $H_2$ evolution on the anode, anode polarization was measured again using the same method described above. A comparison of the anode polarization before and after $H_2$ evolution is shown in FIG. 2.

Figure 2B:
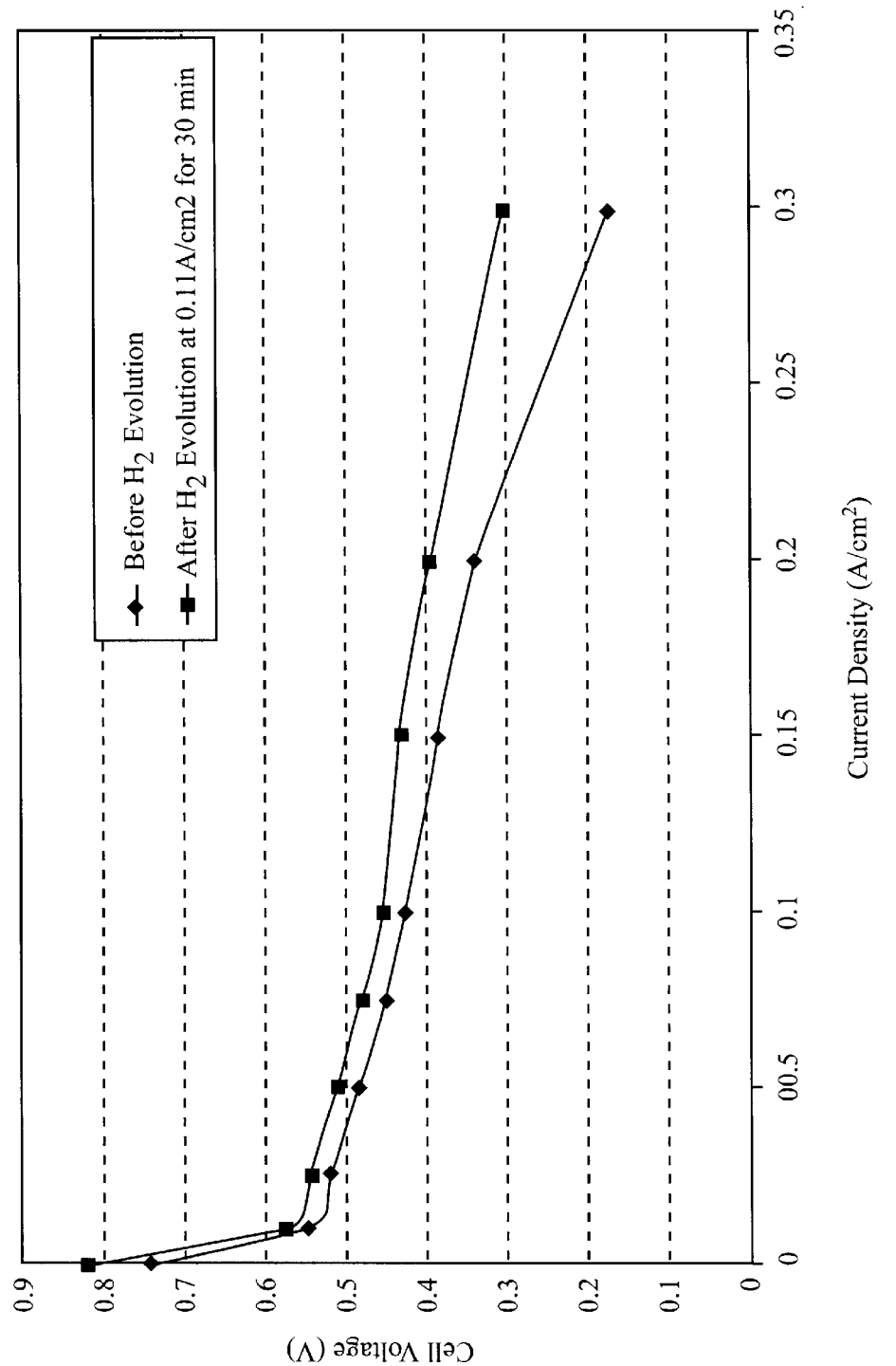
FIG. 2b depicts a graph showing the performance of a direct methanol fuel cell at 60° C., before and after $H_2$ evolution on both the anode and the cathode.

The decrease in overpotential at 200 mA/cm$^2$ was 20 mV. The cell was tested again with air and methanol at 60° C. Compared to the performance before $H_2$ evolution, the performance after $H_2$ evolution was improved by 50 mV at 200 mA/cm$^2$, as illustrated in FIG. 2b.

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. A method for improving $H_2$/air PEM fuel cell performance, more particularly the air cathode, by $H_2$ evolution on the cathode, said PEM fuel cell comprising an anode, a cathode, and a proton exchange membrane, said method comprising the steps of:
   a) feeding humidified hydrogen to the anode;
   b) feeding either humidified hydrogen or a humidified inert gas to the cathode or closing the cathode inlet and keeping the outlet open after removing air from the cathode with the inert gas; and
   c) applying a current to said PEM fuel cell with the cathode being negative and the anode positive.

2. A method for improving direct methanol fuel cell air cathodes by $H_2$ evolution on the cathodes, said direct methanol fuel cell comprising an anode, a cathode, and an ion-exchange membrane, said method comprising the steps of:
   a) feeding methanol to said anode and an inert gas to said cathode;
   b) after removing the air from the cathode with the inert gas, closing the cathode inlet and keeping the cathode outlet open; and
   c) applying a current to said DMFC fuel cell with the cathode being negative and the anode positive.

3. A method for improving direct methanol fuel cell anodes by $H_2$ evolution on the anodes, said direct methanol fuel cell comprising an anode, a cathode, and an ion-exchange membrane, said method comprising the steps of:
   a) feeding methanol to said anode and an inert gas to said cathode;
   b) after removing the air from the cathode with the inert gas, closing the cathode inlet and keeping the cathode outlet open; and
   c) applying a current to said DMFC fuel cell with the cathode being positive and the anode negative and adjusting the applied current so that the cell voltage between the cathode and the anode is in the range of 0.5 V–0.7 V.

* * * * *